(12) United States Patent
Wilkins et al.

(10) Patent No.: US 6,508,933 B2
(45) Date of Patent: Jan. 21, 2003

(54) SELF-CLEANING SHALLOW WATER STRAINER

(75) Inventors: Thomas R. Wilkins, Ann Arbor, MI (US); Charles A. Wilkins, Ann Arbor, MI (US); James O. Stoneburner, Ann Arbor, MI (US)

(73) Assignee: Perfection Sprinkler Co., Ann Arbor, MI (US)

( * ) Notice: Subject to any disclaimer, the term of this patent is extended or adjusted under 35 U.S.C. 154(b) by 0 days.

(21) Appl. No.: 09/841,581

(22) Filed: Apr. 24, 2001

(65) Prior Publication Data

US 2001/0032810 A1 Oct. 25, 2001

Related U.S. Application Data

(60) Provisional application No. 60/199,242, filed on Apr. 24, 2000.

(51) Int. Cl.[7] ............................................. B01D 33/067
(52) U.S. Cl. .................. 210/170; 210/411; 210/413; 210/416.1; 210/455; 210/470; 210/477; 405/127
(58) Field of Search ................................ 210/159, 162, 210/170, 416.1, 416.3, 451, 455, 470, 474, 477, 411, 413; 405/127

(56) References Cited

U.S. PATENT DOCUMENTS

| | | | | | |
|---|---|---|---|---|---|
| 646,876 | A | * | 4/1900 | Schrech | 210/470 |
| 1,222,162 | A | * | 4/1917 | Tinley | 210/470 |
| 1,585,409 | A | * | 5/1926 | Myers | 210/170 |
| 2,515,027 | A | * | 7/1950 | Walton | 210/474 |
| 2,552,493 | A | * | 5/1951 | Newton | 210/170 |
| 4,152,264 | A | * | 5/1979 | Hanna, Sr. | 210/170 |
| 4,822,486 | A | * | 4/1989 | Wilkins et al. | 210/170 |
| 5,071,546 | A | * | 12/1991 | Ruegg | 210/455 |
| 5,215,656 | A | | 6/1993 | Stoneburner | |
| 5,851,087 | A | * | 12/1998 | Berry, III | 405/127 |

OTHER PUBLICATIONS

"Water Master" brochure, undated.*

* cited by examiner

Primary Examiner—Christopher Upton
(74) Attorney, Agent, or Firm—George L. Boller

(57) ABSTRACT

A strainer for immersion in liquid, especially shallow water, to prevent debris from entering a pump connected by a suction pipe to the interior of the strainer. The strainer has a cylindrical housing that is closed at the bottom and covered by a circular screen at the top. As the pump sucks water, the screen prevents debris from being sucked into the strainer interior along with the water. Debris drawn against the screen's exterior is dislodged by a rotating spray arm that contains nozzles and is disposed within the strainer interior to spray water against the screen. The water is fed under pressure to the spray arm through a separate supply line tapped into the pump's outlet. The spray arm nozzles are aimed to direct water generally upward through the screen to dislodge the debris and to cause the spray arm to rotate. Hence, as the spray arm spins, the water washes substantially the full face of the screen.

16 Claims, 4 Drawing Sheets

SELF-CLEANING SHALLOW WATER STRAINER

REFERENCE TO RELATED APPLICATION AND PRIORITY CLAIM

This application derives from the following commonly owned co-pending patent application, the priority benefit of which is expressly claimed: Provisional Application Ser. No. 60/199,242, filed Apr. 24, 2000 in the names of Thomas R. Wilkins, Charles A. Wilkins, and James O. Stoneburner and entitled "Shallow Water Strainer".

FIELD OF THE INVENTION

This invention relates generally to self-cleaning strainers, and in particular to strainers that are adapted to strain liquid being pumped out of a body of liquid, such as water being pumped out of a pond.

BACKGROUND AND SUMMARY OF THE INVENTION

When water is to be pumped out of certain bodies of water, such as an outdoor pit, reservoir, pond, stream, or canal, it is important to prevent debris, such as leaves, sticks, discarded plastic and paper articles, stones, etc., from entering the pump. Rotary self-cleaning strainers that contain cylindrical screens for performing the straining function are often used for this purpose.

Such a strainer is attached to the end of a conduit and placed in the body of water that is to be pumped. The pump is operated to suck water through the strainer and conduit, as the strainer screen prevents debris from being sucked into the conduit along with the water. Certain debris may adhere to the screen's exterior due to the pump suction force. However, the continued adherence of such debris to the screen's exterior, and resulting impairment of flow through the screen, are prevented by rotating the screen past a nozzle structure which is disposed on the interior of the screen and directs water outwardly through the screen to dislodge the debris. The water is fed under pressure to the strainer through a separate supply line that may be tapped into the pump's outlet. The water acts on only a limited circumferential zone of the screen at any given time to force adhering debris away from the exterior of the screen as the screen revolves past the nozzle structure. The remainder of the screen serves to pass the flow of water that is being sucked by the pump.

Because the screen rotates, the strainer cannot lie flat on its side on the bed of the body of water in which it is submerged. Hence, it is disposed in a more or less upright orientation. The pump suction is applied through a suction tube, or pipe, that passes centrally through the strainer and has openings in its side wall through which water that has passed through the screen is sucked into the tube. Because all suction tube openings must be submerged for water to be pumped, and because of the generally upright orientation that is required for the strainer, such a strainer will be unable to pump water out of a body below a certain water level.

Various commonly assigned U.S. Patents, such as U.S. Pat. Nos. 4,822,486; 5,108,592; 5,215,656; 5,356,532; 5,520,808 disclose rotary self-cleaning strainers of this general type.

Another type of self-cleaning strainer that is capable of pumping shallower bodies of water is a shallow water strainer. A known self-cleaning shallow water strainer is described in a document in the accompanying Information Disclosure Statement. That strainer comprises a housing having a circular cylindrical side wall that is closed at its lower end by a circular bottom wall, or floor. A circular screen closes the upper end of the housing side wall. A rotary spray arm is disposed within the housing interior to rotate about a vertical centerline of the housing. The housing side wall contains a through-hole to which a suction pipe on the exterior of the housing is fit. The suction pipe is connected through a pipe, or conduit, to a pump. A supply conduit, or pipe returns some of the pumped water under pressure to the spray arm.

As the pump operates, suction is applied through the suction pipe to the interior of the strainer, drawing water from the interior of the strainer and through the suction pipe. At the same time, pressurized water is returned to the spray arm through the supply conduit. The pressurized water is emitted from the spray arm in a manner that is effective both to dislodge from the screen, debris that is drawn against the exterior of the screen by the suction force of the pump, and to rotate the spray arm. Because the spray arm is cleaning only a limited area of the screen at any given instant, water can be sucked through other areas of the screen into the strainer interior. Because of the spray arm rotation however, adhering debris is being continually dislodged from the screen exterior over the full screen area.

The present invention relates to a strainer that is well suited for immersion in liquid, especially shallow water, to prevent debris, such as leaves, sticks, discarded plastic and paper articles, stones, etc., from entering a pump that is sucking the liquid through the strainer. The strainer is attached to the end of a conduit and immersed in a body of water. The pump is operated to suck water through the strainer and conduit, while a screen of the strainer prevents debris from being sucked through it and into the conduit along with the water. Certain debris may adhere to the screen's exterior due to the pump suction force. However, the continued adherence of such debris to the screen's exterior, and resulting impairment of flow through the screen, are prevented by a rotating spray bar that contains nozzles and is disposed within the interior of the strainer to spray water against the screen. The water is fed under pressure to the spray bar through a separate supply line which may be tapped into the pump's outlet. The spray bar nozzles are aimed to direct water generally upward through the screen dislodging the debris and to cause the spray bar to rotate. Hence, as the spray bar spins, the water washes substantially the full face of the screen.

The present invention provides a number of improvements in a self-cleaning shallow water strainer where water is sucked through a screen that closes the top of a walled strainer housing and a rotating spray arm on the interior of the housing continually cleans the screen.

One aspect of the present invention relates to a self-cleaning strainer that has constructional features that contribute to improvements both in the fabrication and in the performance of the strainer. Polymeric pipes and tubes are used in the fabrication of certain parts of the strainer. Polymeric material is tough and durable, and it is commercially available in various sizes. Various parts are assembled in ways that contribute to overall strength of the finished strainer.

Briefly, the present invention relates to a self-cleaning strainer having a walled housing that encloses an interior space. A straining screen is disposed in covering relation to an opening in the walled housing. The pump sucks liquid from the body of debris-containing liquid into the interior space. A spray mechanism is disposed within the interior space and comprises a spray arm supported for rotation about an axis. The spray mechanism has an inlet via which fluid under pressure is introduced into the spray mechanism and conveyed through the spray arm to outlets spaced apart along the spray arm. The fluid introduced to the spray mechanism inlet under pressure is conveyed through the spray arm to cause the spray arm to rotate about the axis and to be emitted from the spray arm outlets against the screen as the spray arm rotates. A walled suction tube has a portion of its length that contains at least one inlet to the suction tube disposed within the interior space so as to be immersed in liquid within the interior space and continues from that portion through the walled housing to an outlet for communication to pump suction to provide for liquid to be sucked from the interior space through the suction tube.

The axis about which the spray arm rotates is transverse to the portion of the length of the suction tube disposed within the interior space. The spray mechanism is supported on a wall of the housing opposite the straining screen, and a wall of the portion of the suction tube length disposed within the interior space comprises an opening through which the spray mechanism extends from the wall of the housing on which the spray mechanism is supported. The housing comprises a circular cylindrical polymeric side wall having one open end and a circular polymeric end wall that closes the opposite end of the side wall. The straining screen is disposed in covering relation to the one open end of the side wall.

The foregoing features, advantages, and aspects of the invention, along with additional ones, will be seen in the ensuing description and claims, which are accompanied by drawings. The drawings disclose a presently preferred embodiment of the invention according to the best mode contemplated at this time for carrying out the invention.

DESCRIPTION OF THE PREFERRED EMBODIMENT

Figures 1, 2, 3, 4:
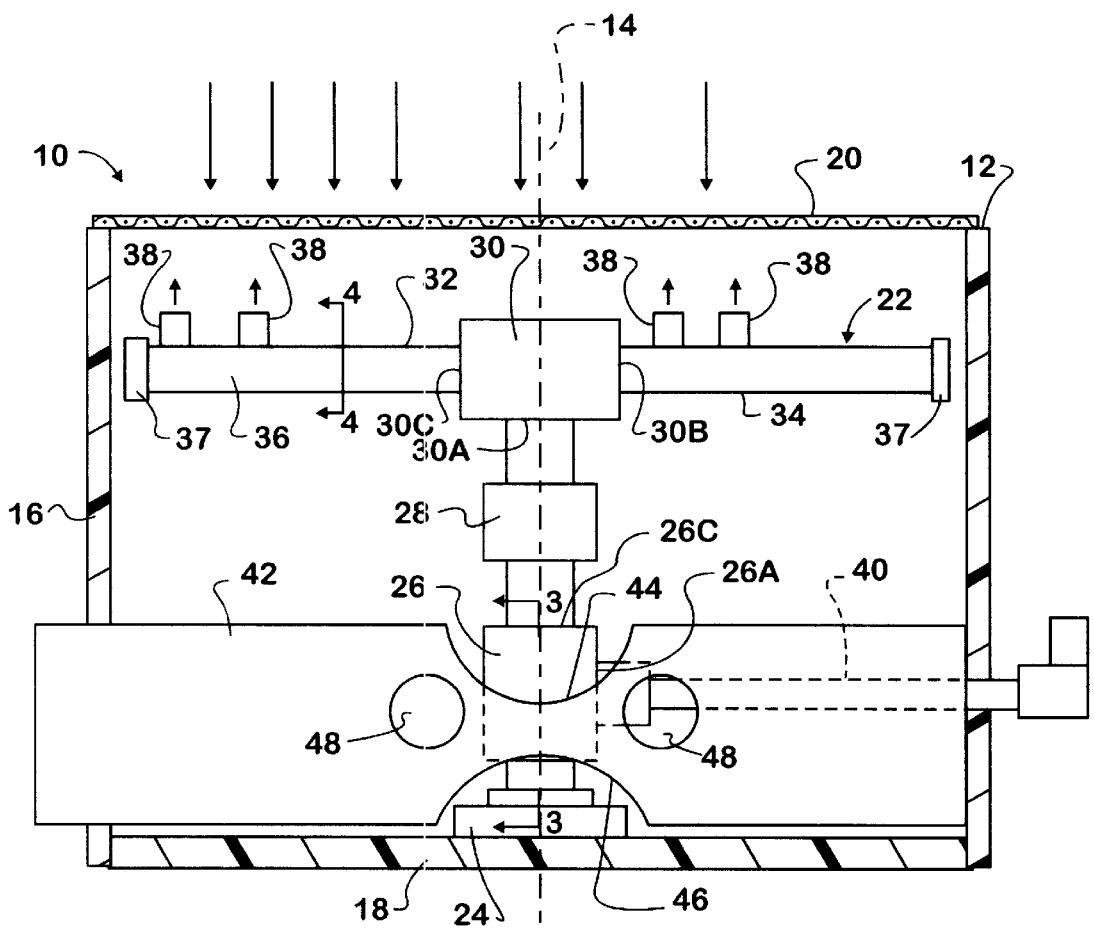
FIG. 1 is a vertical cross section view through a first embodiment of strainer, on an enlarged scale, as taken in the direction of arrows 1—1 in FIG. 2.
FIG. 2 is a top plan view of the strainer.
FIG. 3 is transverse cross sectional view in the direction of arrows 3—3 in FIG. 1.
FIG. 4 is transverse cross sectional view in the direction of arrows 4—4 in FIG. 1.

FIGS. 1–4 present the general organization and arrangement of a shallow water strainer 10 embodying principles of the invention. Strainer 10 comprises a circular cylindrical housing 12 having an imaginary vertical axis 14. Housing 12 has a side wall 16 that is fabricated from plastic pipe, such as 24 inch PVC pipe, a bottom wall, or floor, 18, cut out of 0.5 inch plastic, closing the lower end of side wall 16 and a screen 20 closing the upper end of side wall 16. A spray mechanism 22 is supported upright within the housing interior, resting on the center of bottom wall 18.

Spray mechanism 22 comprises, in order from bottom to top, a base, or floor flange, 24, a tee 26, a sprinkler bearing 28, and another tee 30. Tee 30 forms the middle of a spray arm, or bar, 32 that comprises two pipes 34, 36 extending from opposite ends 30B, 30C of the tee perpendicular to axis 14 and being closed at their far ends by caps 37. Spray bar 32 comprises several nozzles 38 spaced in succession along each pipe 34, 36 and pointing generally upward for directing individual sprays toward screen 20. Floor flange 24 is stationarily mounted on floor 18. Tee 26 mounts on floor flange 24, with one end 26B of the tee being closed by floor flange 24.

A feed, or supply, pipe 40 feeds into an end 26A of tee 26. Pipe 40 passes through, and is sealed to, a hole in side wall 16. An end 26C of tee 26 connects to an inlet of sprinkler bearing 28. An outlet of sprinkler bearing 28 connects to an end 30A of tee 30. Sprinkler bearing 28 enables spray bar 32 to rotate about axis 14.

A suction tube, or pipe, 42, such as a PVC pipe, is disposed generally perpendicular to axis 14 just above floor 18. Pipe 42 passes through and is sealed to a hole in side wall 16 generally opposite the hole through which supply pipe 40 passes. The end of pipe 42 that is external to the housing interior is connected to the suction side of a pump (not shown). The opposite end of pipe 42 is preferably closed off in any suitable manner. One way is to cut the end for a conforming fit against the interior of side wall 16, that could include suitable sealing around the perimeter. Another way is to plug it with a circular plug, or cover it with a closure. Such a plug or closure is attached to the suction pipe in any suitable fashion, and when so attached, may be used to secure the suction pipe in place. For example the pipe may be secured by fasteners that fasten the plug or cover to the housing side wall 16. Such a plug or cover contains a hole allowing supply pipe 40 to pass through.

Two holes 44, 46 are cut in the wall of pipe 42 opposite each other to provide space for floor flange 24 and tee 26. Additional holes, such as holes 48 may be cut in the tube side wall.

In use, strainer 10 is immersed in water, pipe 42 is connected through a suitable conduit to the suction side of a pump, and pipe 40 is connected through a suitable conduit to a source of water under pressure, such as a tap at the pump outlet. When water is forced at suitable pressure into feed pipe 40, the water enters tee 26, passes through sprinkler bearing 28, enters tee 30, and flows through spray bar 32. The water is emitted as individual sprays from nozzles 38 directed against screen 20. The nozzles are canted at appropriate angles to cause the spray bar to rotate as it washes the screen, thereby dislodging adhering debris from the exterior of the screen as it revolves. At the same time water is being sucked through the screen to enter pipe 42 through holes 44, 46, 48. The arrangement of the holes is believed advantageous for avoiding, or at least minimizing, hot spots at the screen. By fastening pipe to the housing, such as to the housing side wall, and possibly the bottom wall, it can aid in making the housing structurally stronger, allowing a relatively large diameter pipe such as the one forming the housing side wall to be non-metallic and relatively thinner than it might otherwise be in the absence of the illustrated suction pipe arrangement.

The use of a number of non-metallic parts may enable the strainer to be more durable and lighter in weight. If necessary however, it could be weighted down when used.

Figure 5:
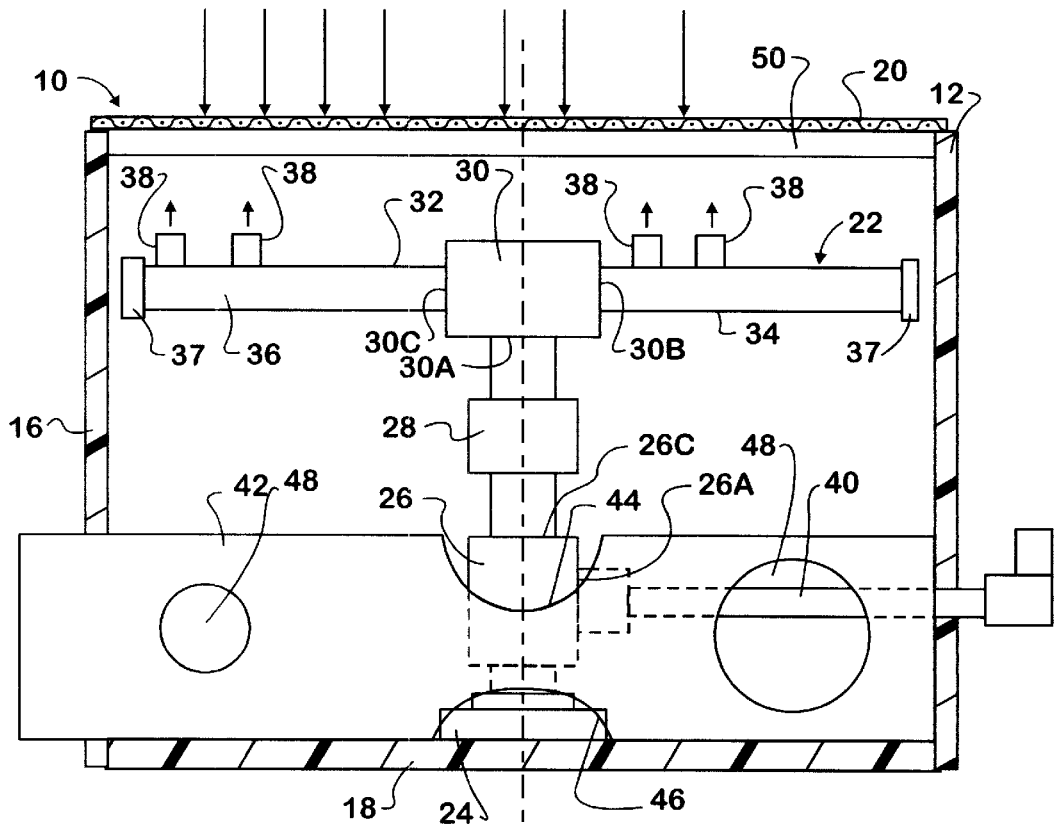
FIG. 5 is view similar to FIG. 1 showing a modified form.

FIG. 5 shows an alternate embodiment where the arrangement of holes 48 is different. Holes 44 and 46 are still present for clearance to the floor flange and lower tee. The hole area 48 that is disposed toward the left of holes 44, 46, and is nearer the suction force, is smaller than the hole area 48 that is disposed toward the right of holes 44, 46, and is farther from the suction force. The total area of holes 44, 46 is larger than the total area of holes 48 toward their left, but smaller than the total area of holes 48 toward their right.

Figure 6:
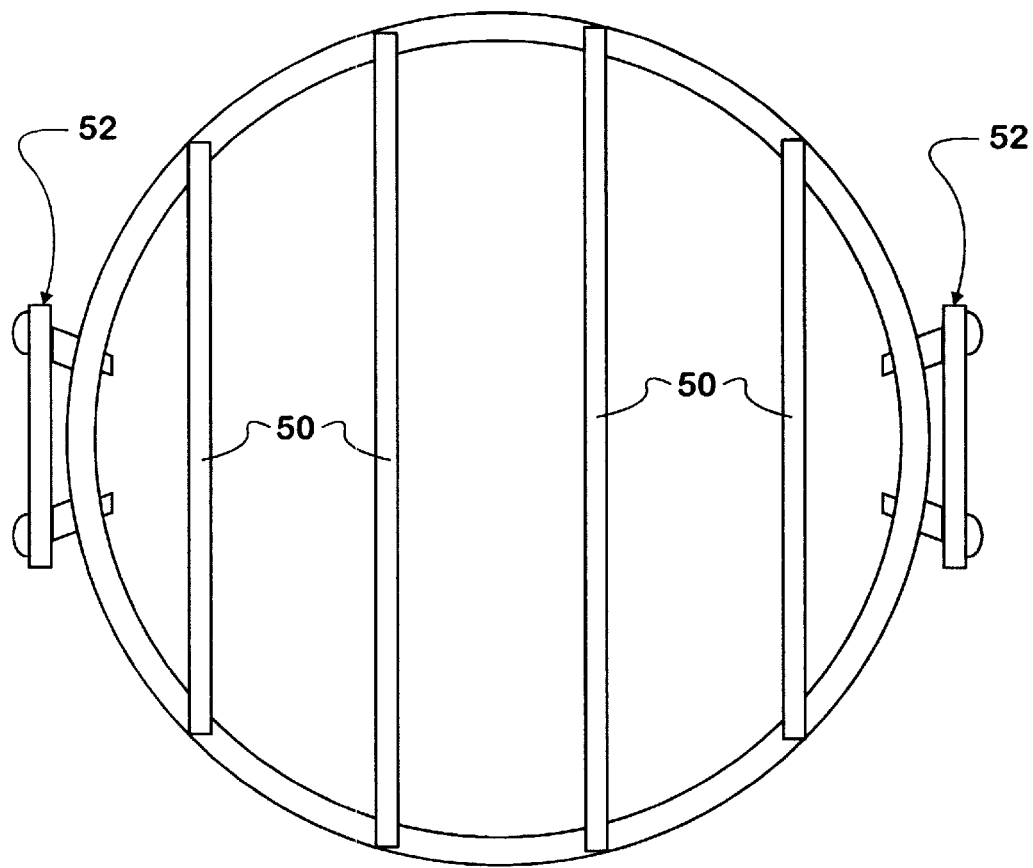
FIG. 6 is a top plan view showing additional features.

FIG. 5 also shows a series of support bars 50 for screen 20. The support bars are also shown in FIG. 6. They are stainless steel bars, one inch wide by ⅛ inch thick, and are spaced apart parallel, as shown in FIG. 6. The rim of housing side wall 16 contains notches for accepting the ends of the support bars, preferably with press fits, so that the tops of the bars are flush with the side wall rim. In this way, foreign material cannot intrude, and the screen can fit flatly on the rim while having subjacent support from the support bars. The support bars allow screen 20 to be relatively thin, such as 0.080 inch perforated aluminum sheet for example, and occupy only a small portion of the total screen area. The screen can be secured to the housing side wall by screws that pass through the margin of the screen and into the rim of the side wall. It should be understood that the support bars would be used in FIG. 1 although not specifically shown in that Figure.

FIG. 6 also shows carrying handles 52 on opposite sides of the side wall to enabling the strainer to be conveniently lifted and moved.

Figure 7:
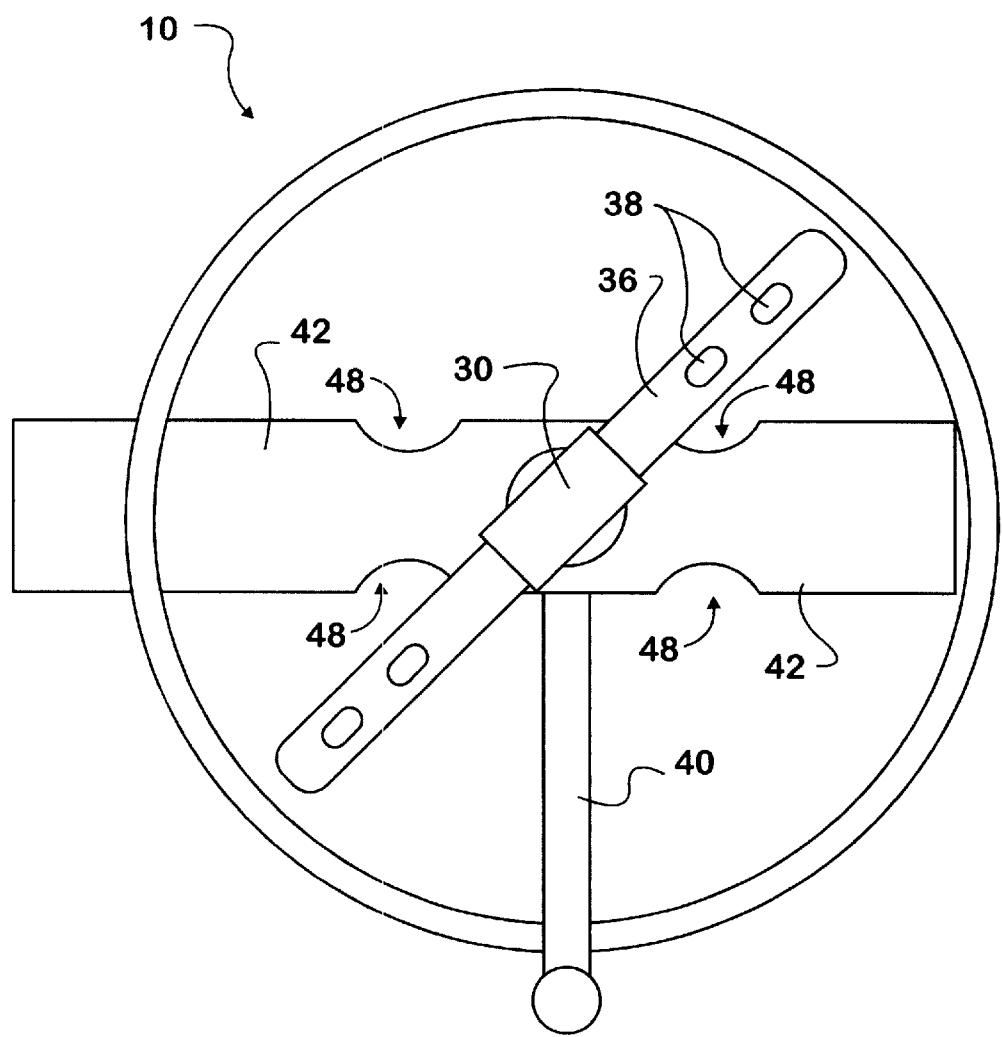
FIG. 7 is a top plan view showing another modified form.

FIG. 7 shows an alternate arrangement for the supply pipe 40. Here the supply pipe enters the housing side wall perpendicular to suction pipe 42. The holes at the center of the suction pipe may be modified to allow the supply pipe to pass through and be connected to tee 26. The supply pipe may be rigid, or it may be flexible. If it is flexible, a strainer can be constructed so that the supply pipe enters the housing at any desired point and routed from there to the tee.

While a presently preferred embodiment of the invention has been illustrated and described, it should be appreciated that principles of the invention are applicable to other embodiments.

What is claimed is:

1. A self-cleaning strainer adapted for connection to a suction pump and immersion in a body of debris-containing liquid to prevent debris in the liquid from being sucked along with the liquid into the pump, the strainer comprising:

a walled housing that encloses an interior space;

a straining screen which is disposed in covering relation to an opening in the walled housing and through which the pump sucks liquid from the body of debris-containing liquid into the interior space;

a spray mechanism that is disposed within the interior space and comprises a spray arm supported for rotation about an axis, the spray mechanism comprising an inlet via which fluid under pressure is introduced into the spray mechanism and conveyed through the spray arm to outlets spaced apart along the spray arm;

wherein fluid introduced to the spray mechanism inlet under pressure is conveyed through the spray arm to cause the spray arm to rotate about the axis and to be emitted from the spray arm outlets against the screen as the spray arm rotates about the axis;

and a walled suction tube having a portion of its length that contains at least one inlet to the suction tube disposed within the interior space so as to be immersed in liquid within the interior space and continuing from that portion through the walled housing to an outlet for communication to pump suction to provide for liquid to be sucked from the interior space through the suction tube;

wherein the axis about which the spray arm rotates is transverse to the portion of the length of the suction tube disposed within the interior space;

and the spray mechanism inlet comprises an inlet conduit extending away from the spray mechanism and in doing so, passing through the interior of the suction tube and ending exterior of the walled housing for connection to a source for providing the fluid under pressure.

2. A self-cleaning strainer as set forth in claim 1 which spray arm comprises a pipe and the outlets comprise nozzles attached to the pipe.

3. A self-cleaning strainer as set forth in claim 2 in which the nozzles are arranged both to cause the spray arm to rotate about the axis and fluid to be emitted toward the screen as the spray arm rotates about the axis.

4. A self-cleaning strainer as set forth in claim 1 in which the walled housing comprises a cylindrical side wall having one open end covered by the straining screen and an end wall that closes the opposite end of the side wall.

5. A self-cleaning strainer as set forth in claim 4 including supports spanning the one open end of the side wall and providing subjacent support to the straining screen.

6. A self-cleaning strainer as set forth in claim 5 in which the one open end of the side wall comprises a rim, and the supports comprise spaced-apart bars supported on the rim.

7. A self-cleaning strainer as set forth in claim 4 in which the cylindrical side wall comprises a polymeric tubular part, and the end wall comprises a flat polymeric part.

8. A self-cleaning strainer as set forth in claim 4 in which the spray mechanism is disposed centrally of the side wall and uprightly supported on the end wall to dispose the spray arm axis concentric with a central zone of the strainer screen.

9. A self-cleaning strainer as set forth in claim 1 in which the portion of the suction tube length that contains at least one inlet to the suction tube comprises multiple inlets spaced apart along the length of that portion.

10. A self-cleaning strainer adapted for connection to a suction pump and immersion in a body of debris-containing liquid to prevent debris in the liquid from being sucked along with the liquid into the pump, the strainer comprising:

a walled housing that encloses an interior space;

a straining screen which is disposed in covering relation to an opening in the walled housing and through which the pump sucks liquid from the body of debris-containing liquid into the interior space;

a spray mechanism that is disposed within the interior space and comprises a spray arm supported for rotation about an axis, the spray mechanism comprising an inlet via which fluid under pressure is introduced into the spray mechanism and conveyed through the spray arm to outlets spaced apart along the spray arm;

wherein fluid introduced to the spray mechanism inlet under pressure is conveyed through the spray arm to cause the spray arm to rotate about the axis and to be emitted from the spray arm outlets against the screen as the spray arm rotates about the axis;

and a walled suction tube having a portion of its length that contains at least one inlet to the suction tube disposed within the interior space so as to be immersed in liquid within the interior space and continuing from that portion through the walled housing to an outlet for communication to pump suction to provide for liquid to be sucked from the interior space through the suction tube;

wherein the axis about which the spray arm rotates is transverse to the portion of the length of the suction tube disposed within the interior space;

the walled housing comprises a cylindrical side wall having one open end covered by the straining screen and an end wall that closes the opposite end of the side wall and the spray mechanism is supported on the end wall, and the portion of the suction tube length disposed within the interior space comprises an opening through which the spray mechanism extends uprightly from the end wall.

11. A self-cleaning strainer as set forth in claim 10 in which the opening in the suction tube through which the spray mechanism extends uprightly forms one of the at least one inlets to the suction tube.

12. A self-cleaning strainer as set forth in claim 10 in which the spray mechanism inlet comprises an inlet pipe, a portion of whose length extends through the interior of the suction tube and continues through the walled housing for connection to a source for providing the fluid under pressure.

13. A self-cleaning strainer adapted for connection to a suction pump and immersion in a body of debris-containing liquid to prevent debris in the liquid from being sucked along with the liquid into the pump, the strainer comprising:

a walled housing that encloses an interior space;

a straining screen which is disposed in covering relation to an opening in the walled housing and through which the pump sucks liquid from the body of debris-containing liquid into the interior space;

a spray mechanism, including a spray arm that is disposed within the interior space, into which fluid under pressure is introduced for conveyance through the spray arm to outlets spaced apart along the spray arm;

wherein fluid introduced to the spray mechanism under pressure is conveyed through the spray arm to cause the spray arm to rotate about the axis and fluid to be emitted from the spray arm outlets toward the screen as the spray arm rotates about the axis;

a walled suction tube having a portion of its length that contains at least one inlet to the suction tube disposed within the interior space so as to be immersed in liquid within the interior space and continuing from that portion through the walled housing to an outlet for communication to pump suction to provide for liquid to be sucked from the interior space through the suction tube;

wherein the spray mechanism is supported on a wall of the housing opposite the straining screen, and a wall of the portion of the suction tube length disposed within the interior space comprises an opening through which the spray mechanism extends from the wall of the housing on which the spray mechanism is supported, and the spray arm is disposed beyond the opening in the suction tube wall relative to the wall of the housing on which the spray mechanism is supported.

14. A self-cleaning strainer as set forth in claim 13 in which the opening in the suction tube wall forms one of the at least one inlets to the suction tube.

15. A self-cleaning strainer as set forth in claim 13 in which the spray mechanism inlet comprises an inlet pipe, a portion of whose length extends through the interior of the suction tube and continues through the walled housing for connection to a source for providing the fluid under pressure.

16. A self-cleaning strainer as set forth in claim 13 in which the walled housing comprises a circular cylindrical side wall having one open end covered by the straining screen and an end wall that closes the opposite end of the side wall, and the portion of the length of the suction tube that is disposed within the interior space is disposed substantially on an inside diameter of the cylindrical side wall.

* * * * *